United States Patent
Pagliani et al.

(10) Patent No.: US 10,099,609 B2
(45) Date of Patent: Oct. 16, 2018

(54) MACHINE SAFETY DOME

(71) Applicant: InfoMobility S.r.L., Concordia Sulla Secchia (IT)

(72) Inventors: Daniele Pagliani, Turin (IT); Nicola Finardi, Castel Maggiore (IT); Aldo Longhi, Quistello (IT); Ivan Di Federico, Argenta (IT)

(73) Assignee: InfoMobility S.r.L., Concordia Sulla Secchia (MO) (IT)

( * ) Notice: Subject to any disclaimer, the term of this patent is extended or adjusted under 35 U.S.C. 154(b) by 168 days.

(21) Appl. No.: 14/789,467

(22) Filed: Jul. 1, 2015

(65) Prior Publication Data

US 2016/0001701 A1 Jan. 7, 2016

Related U.S. Application Data

(60) Provisional application No. 62/020,516, filed on Jul. 3, 2014.

(51) Int. Cl.
*B60W 30/09* (2012.01)
*G05D 1/02* (2006.01)
(Continued)

(52) U.S. Cl.
CPC ............ *B60Q 9/008* (2013.01); *B25J 9/1666* (2013.01); *B60W 30/09* (2013.01); *E21C 35/08* (2013.01);
(Continued)

(58) Field of Classification Search
CPC ....... B25J 9/1666; B60C 9/008; B60W 30/09; E21C 35/08; G01S 13/865; G01S 13/867;
(Continued)

(56) References Cited

U.S. PATENT DOCUMENTS

2006/0190124 A1* 8/2006 Makela ................. G05D 1/028
700/213
2009/0030549 A1 1/2009 Sakai et al.
(Continued)

FOREIGN PATENT DOCUMENTS

DE 102005011143 A1 9/2006

OTHER PUBLICATIONS

International Search Report and Written Opinion dated Oct. 1, 2015, in connection with International Patent Application No. PCT/US2015/038988, 12 pgs.

*Primary Examiner* — Charles J Han
(74) *Attorney, Agent, or Firm* — Chiesa Shahinian & Giantomasi PC

(57) ABSTRACT

A site-aware controller and various sensors determine if objects are located within a safety dome surrounding a machine such as a construction vehicle. The site-aware controller compares data from the various sensors to determine if the machine or independently moveable implements located on the machine are capable of impacting objects within the safety dome and/or travel of the machine into restricted areas. Detection of objects within the safety dome can trigger alerts (e.g., visual and/or audible) to an operator of the machine of a particular situation. Detection of objects within the safety dome can also prevent further movement of the machine or independently moveable implements located on the machine to prevent impacting the objects. The system can also prevent movement of the machine into restricted areas.

14 Claims, 7 Drawing Sheets

(51) Int. Cl.
| | |
|---|---|
| *E21C 35/08* | (2006.01) |
| *G05B 19/4061* | (2006.01) |
| *B25J 9/16* | (2006.01) |
| *B60Q 9/00* | (2006.01) |
| *G06K 9/00* | (2006.01) |
| *G01S 17/93* | (2006.01) |
| *G01S 13/86* | (2006.01) |
| *G01S 13/93* | (2006.01) |

(52) U.S. Cl.
CPC .......... *G01S 13/865* (2013.01); *G01S 13/867* (2013.01); *G01S 13/931* (2013.01); *G01S 17/936* (2013.01); *G05B 19/4061* (2013.01); *G05D 1/0214* (2013.01); *G06K 9/00805* (2013.01); *G05B 2219/45012* (2013.01); *G05B 2219/49138* (2013.01)

(58) Field of Classification Search
CPC . G01S 13/931; G01S 17/936; G05B 19/4061; G05B 2219/45012; G05B 2219/49138; G05D 1/0214; G06K 9/00805; B60Q 9/008
See application file for complete search history.

(56) References Cited

U.S. PATENT DOCUMENTS

| | | | |
|---|---|---|---|
| 2009/0171505 A1* | 7/2009 | Okazaki ................. | B25J 9/1676 700/258 |
| 2013/0241316 A1* | 9/2013 | Morikawa .......... | G05B 19/4061 307/326 |
| 2013/0261885 A1* | 10/2013 | Hargrave, Jr. .......... | E02F 9/262 701/34.4 |

\* cited by examiner

MACHINE SAFETY DOME

This application claims the benefit of U.S. Provisional Application No. 62/020,516 filed Jul. 3, 2014, which is incorporated herein by reference in its entirety.

BACKGROUND

The present disclosure relates generally to machines, such as construction, mining, transportation, and agricultural machines, and more particularly to a machine safety dome system for detecting obstacles (e.g., objects or humans) and avoidance areas within a predetermined proximity of a machine.

Operation of machines, such as construction machines, requires an operator to remain aware of an area in which the machine operates. In addition to the operation the operator is trying to perform, the operator must maintain a situational awareness of the area surrounding the machine. For example, while performing a task, an operator must remain aware of any nearby power lines, fixed obstructions (e.g., terrain such as ditches and boulders,) moveable obstructions such as other machines and movable equipment, areas that should be avoided, and other people, objects, and instruments. Maintaining awareness of not only the operations to be performed, but various obstructions, objects, and people, requires continuous focus, which an operator may not be capable of for long periods of time.

SUMMARY

In one embodiment, a method for alerting a user to objects located within a volume surrounding a machine includes determining a volume surrounding the machine based on the machine and an independently moveable implement attached to the machine. It is then determined whether an obstacle is located within the volume and an indication is generated based on the obstacle being located within the volume. The indication is then output to a user. In one embodiment, the determining the volume surrounding the machine includes determining a velocity of the machine and the volume is further based on the velocity of the machine. In one embodiment, the determining a volume surrounding the machine includes determining a velocity of the independently moveable implement attached to the machine and the volume is further based on the velocity of the independently moveable implement attached to the machine. An obstacle can be one of a fixed obstruction, a moveable obstruction, a person, or an area to be avoided. In one embodiment, it is determined that an interaction with the obstacle will occur based on one of a current velocity of the machine and a current velocity of the independently moveable implement attached to the machine. A control signal is generated to prevent the interaction with the obstacle in response to the determining that the interaction with the obstacle will occur. In one embodiment, the determining whether the obstacle is located within the volume is based on data pertaining to a site in which the machine is located. In one embodiment, the data identifies areas of the site to be avoided.

An apparatus and computer readable medium for alerting a user to objects located within a volume surrounding a machine are also described herein.

These and other advantages of the invention will be apparent to those of ordinary skill in the art by reference to the following detailed description and the accompanying drawings.

DETAILED DESCRIPTION

Figure 1:
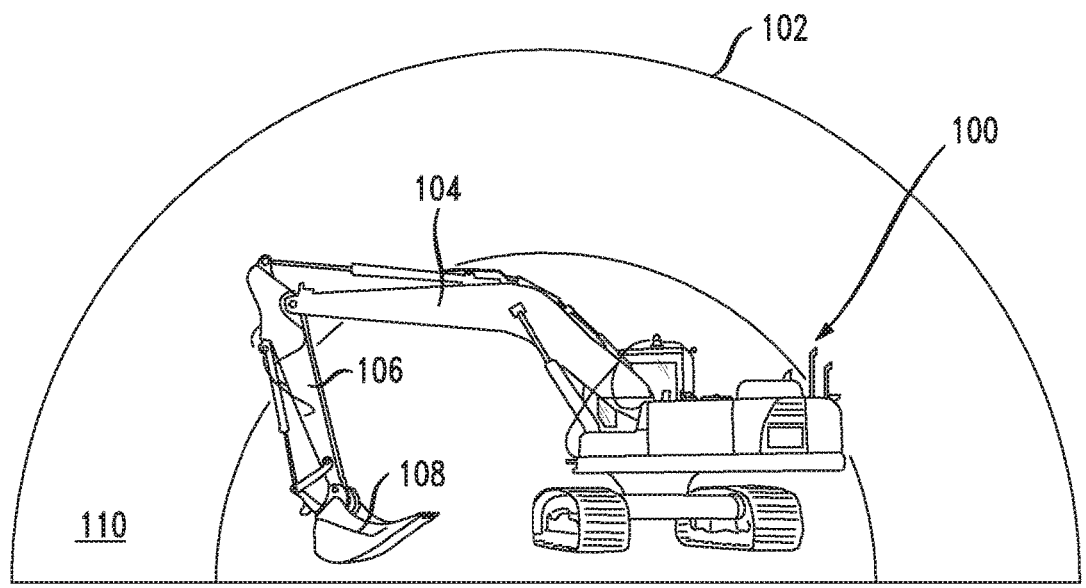
FIG. 1 depicts a machine and associated safety dome according to an embodiment.

FIG. 1 depicts machine 100, in this example an excavator, enclosed within safety dome 102. In one embodiment, safety dome 102 is a three-dimensional space (e.g., a volume) in which machine 100 and its independently moveable implements, including boom 104, stick 106, and bucket 108, currently occupy or could occupy, based on a current location and possible movement of machine 100 and/or its independently moveable implements. For example, the volume can be determined based on the location of machine 100 and the volume in which boom 104, stick 106, and bucket 108 can move within (vertically and horizontally) based on the location of machine 100. Safety dome 102, in one embodiment, is a virtual half-sphere which represents a current volume in which machine 100 operates. Generally, the safety dome is the whole volume surrounding the machines in which the machine can operate and where a user would need to know if obstacles are present. The actual dimensions of safety dome 102 can vary based on factors such as the machine which operates within the safety dome, a desired margin of safety around the machine, the speed of the machine and/or independently moveable implements attached to the machine, and other factors as desired. For at least this reason, the shape and size of the safety dome can vary. In one embodiment, a safety dome system tracks a position and movement of machine 100 and independently moveable implements attached to the machine and determines objects within the volume of safety dome 102 continuously in order to determine if an operator should be made aware of an object, such as object 110, located in safety dome 102.

Figure 2:
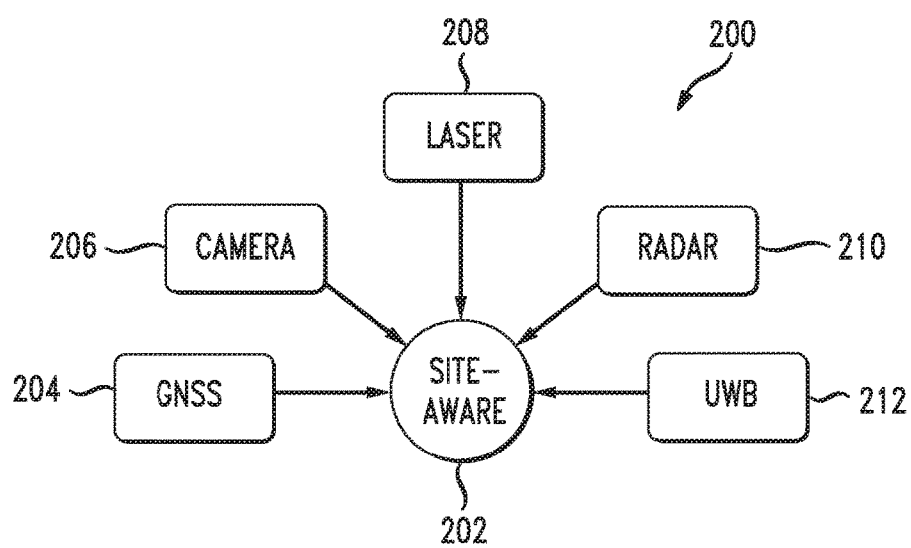
FIG. 2 depicts a high level schematic of a safety dome system according to an embodiment.

FIG. 2 depicts a high level schematic of safety dome system 200 according to one embodiment. The components of safety come system 200, in one embodiment, are attached to machine 100 in various places. Site-aware controller 202, in one embodiment, is a computer or embedded computer which receives inputs concerning the site in which machine 100 operates and movements of machine 100 and its implements, determines if an object or situation requires an operator of machine to be alerted, and triggers such an alert as necessary. Site-aware controller 202, in one embodiment, is mounted in a cab of machine 100. Site-aware controller 202 is in communication with multiple sensors for determining objects located within safety dome 102 as well as objects located nearby but outside of safety dome 102. In one embodiment, the sensor are located in a cab of machine 100 but can be attached to the machine in various locations. One or more of the multiple sensors can be used to determine the position and movement (e.g., velocity) of an independently moveable implement attached to the machine. As shown in FIG. 2, site-aware controller 202 is in communication with camera 206, laser 208, and radar unit 210, each of which can be used to determine objects located within safety dome 102 using various methods. Site-aware controller 202 is also in communication with Global Navigation Satellite System ("GNSS") 204 which, in one embodiment is a Global Positioning System ("GPS") receiver. Site-aware controller 202 is also in communication with Ultra Wide Band ("UWB") receiver 212.

In one embodiment, objects (such as object 110 shown in FIG. 1) located within safety dome 102 are detected using camera 206, laser 208, and radar unit 210 and a position of machine 100 is determined using GNSS 204. UWB receiver 212, in one embodiment, is part of a wireless network that facilitates communications and can also be used to determine distances from the receiver and objects and sensing and recognizing objects and live obstacles (such as humans).

Figure 3:
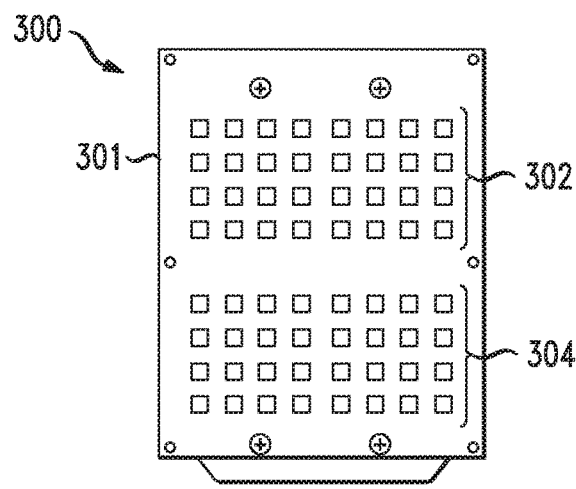
FIG. 3 depicts a radar unit according to an embodiment.
Figure 4:
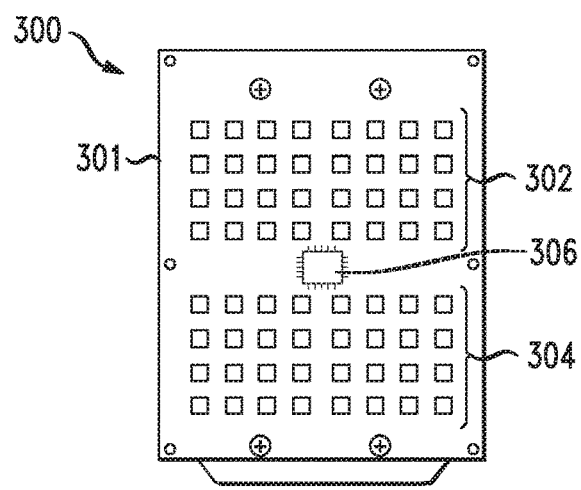
FIG. 4 depicts an additional view of the radar unit of FIG. 3.

FIG. 3 depicts radar unit 300 which is used to detect objects near machine 100 in safety dome 102. Radar unit 300, in one embodiment, comprises transceiver arrays 302, 304 mounted to a housing 301 of radar unit 300. In one embodiment, radar unit 300 is a 24 GHz radar unit but can be other types of radar units with different frequencies as well depending on various factors such as required accuracy and distance at which objects are to be detected. FIG. 4 depicts radar unit 300 showing processor 306 located, in one embodiment, within the housing 301 of radar unit 300. Processor 306 communicates with transceiver arrays 302, 304 and with site-aware controller 202.

Figure 5:
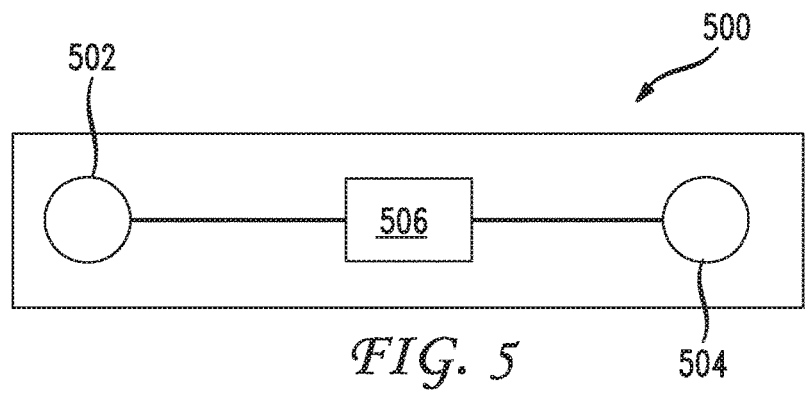
FIG. 5 depicts a stereo camera according to one embodiment.

FIG. 5 depicts stereo camera 500 which, in one embodiment, is used as camera 206 depicted in FIG. 2. Stereo camera 500 comprises first image capturing device 502, second image capturing device 504, and processor 506 mounted on a common member, in one embodiment, a printed circuit board. First image capturing device 502 and second image capturing device are in communication with processor 506, which is in communication with site-aware controller 202. The use of two image capturing devices located a distance apart from one another allows objects to be identified and also allows for a distance of an object from the camera to be determined based on differences between the two images generated by the image capturing devices. Image information from stereo camera 500 is transmitted to site-aware controller 202 which uses the information to locate and identify objects near machine 100.

First image capturing device 502 and second image capturing device 504 of stereo camera 500 are, in one embodiment, image capturing devices similar to those used in cameras for taking pictures. In other embodiments, first image capturing device 502 and second image capturing device 504 are other types of devices such as high resolution cameras, high spectral cameras, time of flight cameras, or other types of image capturing devices.

Figure 6:
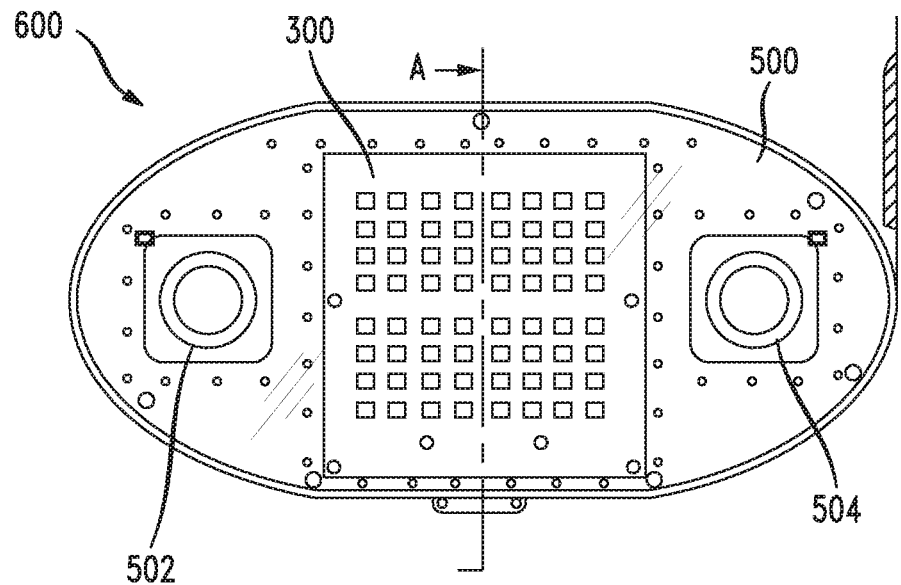
FIG. 6 depicts an obstacle detection unit according to one embodiment.
Figure 7:
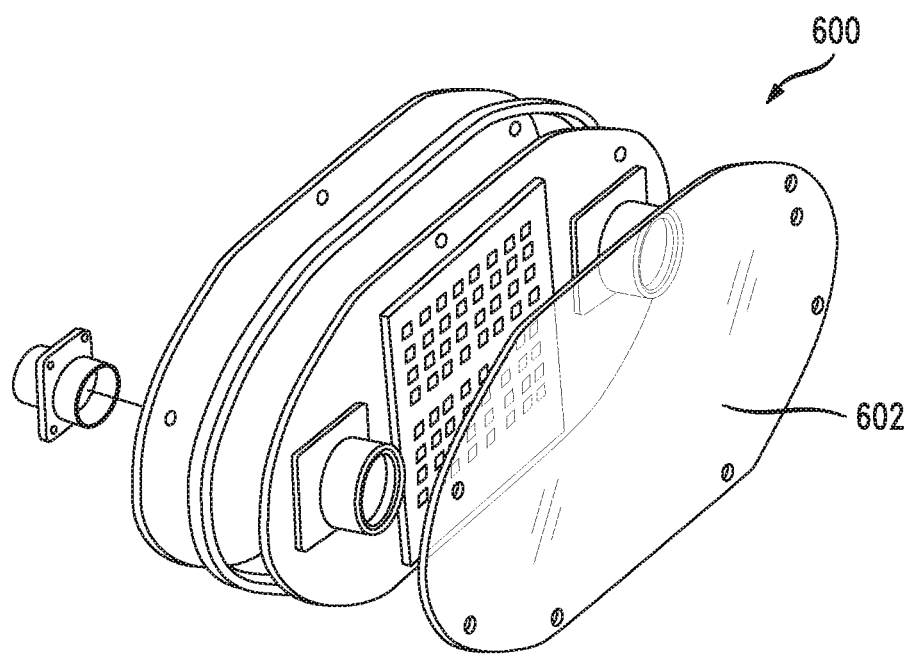
FIG. 7 depicts an exploded view of the obstacle detection unit of FIG. 6.

FIG. 6 depicts one embodiment in which radar unit 300 and stereo camera 500 are combined to form obstacle detection unit 600. As shown in FIG. 6, in one embodiment, radar unit 300 is located between first image capturing device 502 and second image capturing device 504 of the stereo camera. FIG. 7 depicts obstacle detection unit 600 having protective transparent shield 602 according to one embodiment in which shield 602 prevents damage to radar unit 300 and stereo camera 500.

Figure 8:
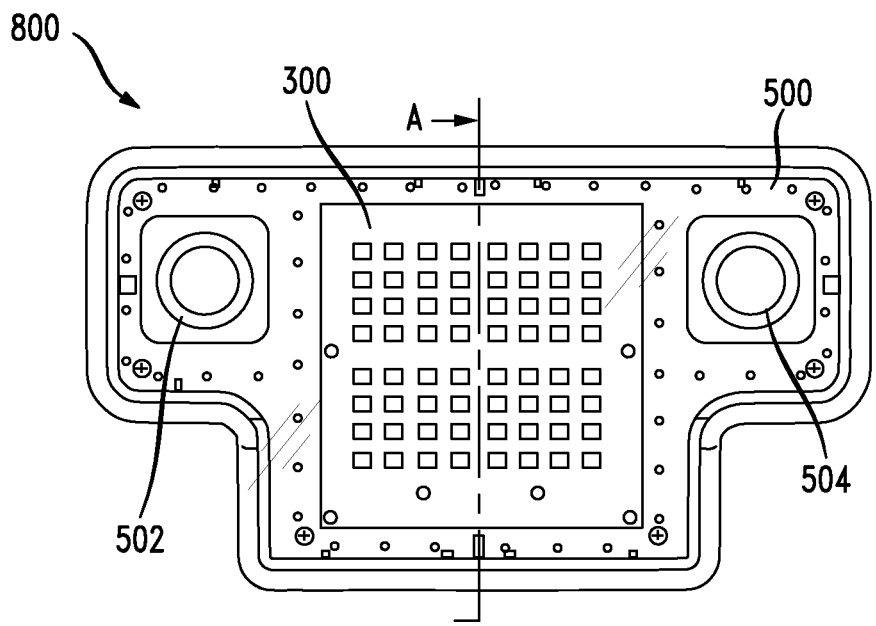
FIG. 8 depicts an obstacle detection unit according to an alternative embodiment.
Figure 9:
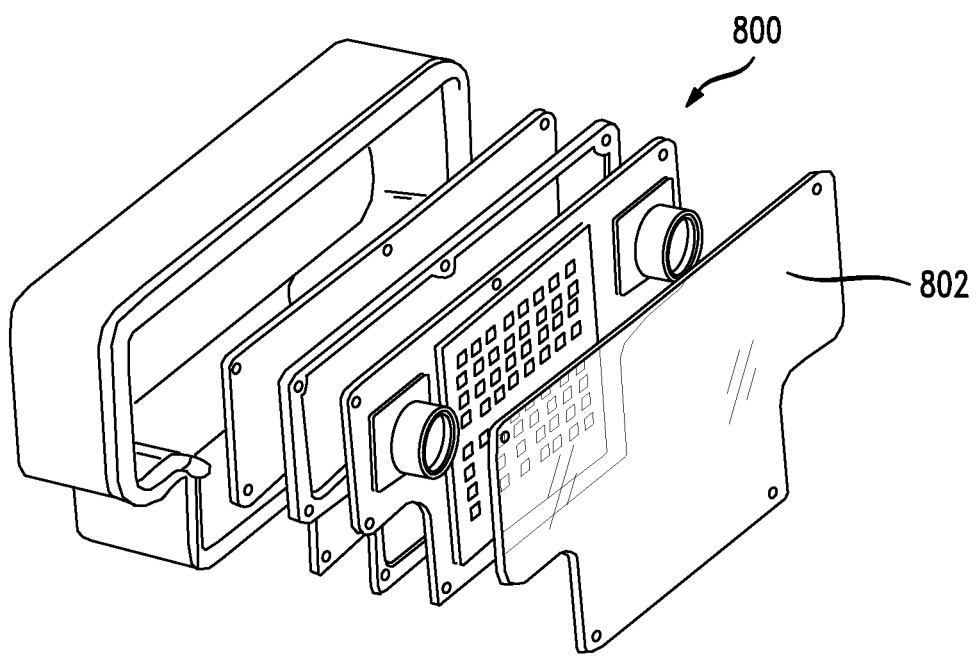
FIG. 9 depicts an exploded view of the obstacle detection unit of FIG. 8.

FIG. 8 depicts an alternative embodiment in which radar unit 300 and stereo camera 500 are combined to form obstacle detection unit 800 having a form factor different from obstacle detection unit 600. FIG. 9 depicts obstacle detection unit 800 having protective transparent shield 802 according to one embodiment in which shield 802 prevents damage to radar unit 300 and stereo camera 500.

Stereo camera 500 and radar unit 300 have complementary weak points. Dust, fog, rain, snow, and direct sun on one or both of the image capturing devices degrades the output of stereo camera 500. However, operation of radar unit 300 is not affected by these conditions. The performance of radar unit 300 is degraded when used in a small working area or when metallic dust is present. However, operation of stereo camera 500 is not affected by these conditions. As such, the conditions that affect one detection device do not affect the other resulting in continuous observation of the area near a machine on which the devices are located.

In one embodiment, radar unit 300 is a 24 GHz radar unit that measures the distance of objects located around an antenna of radar unit 300. Radar unit 300, in one embodiment, is used to determine the speed and direction of the machine on which radar unit 300 is located. Stereo camera 500, in one embodiment, measures the distance of multiple targets simultaneously. Both radar unit 300 and stereo camera 500 can be used to create a three-dimensional model of the surrounding environment and measure the dimensions of objects located near the machine on which the devices are mounted.

In one embodiment, obstacle detection units 600, 800 have one or more of the following parameters. An ARM dual core or AMD Kabini processor based on the power requirements of stereo camera 500. An Artix 7 Xilix Field Programmable Gate Array. An ARM dual core 1 gigabyte or AMD Kabini 4 gigabyte RAM. 8 gigabytes or more of flash memory. A 10/100/1000 Ethernet component. A No. 1 CAN BUS. A triaxial accelerometer. LEDs for illumination. An 8 to 32 volt power supply. Obstacle detection units 600,800, in one embodiment, are fanless and can operate in a temperature range from −40 degrees Celsius to 85 degrees Celsius.

In one embodiment, safety dome system 200 operates as follows. Information concerning an area in which machine 100 is to operate is loaded onto site-aware controller 202. The size and shape of safety dome 102 is loaded onto site-aware controller 202 and/or is entered by a machine operator. As previously described, safety dome 102 is a virtual volume in which a machine and an attached independently moveable implement (such as a bucket, stick, and boom) operate. It should be noted that the size and shape of safety dome 102 can vary based on the size of machine 100, the range of motion of independently moveable implements mounted on machine 100, and a desired safety margin. In one embodiment, the safety dome has a dome shape with machine 100 approximately centered within the dome and a size based on a distance an independently moveable implement of machine 100 can be extended away from machine 100. After the information is loaded onto site-aware controller 202, an operator may begin using machine 100. Site-aware controller 202 continuously (or periodically in certain embodiments) receives information from camera 206, laser 208, radar unit 210, GNSS 204, and UWB 212. In one embodiment, the information received from multiple devices is manipulated using sensor fusion techniques. These sensor fusion techniques, in one embodiment, allow more information to be inferred from two or more sensors than could be determined based on information received from each sensor. The sensor fusion techniques also provide improved robustness due to contemporaneous use of multiple sensors using different technologies. In addition, the reliability of the system is increased due to redundancy.

In one embodiment, the information received from the various sensors is used to determine if machine 100, and any independently moveable implements associated with machine 100, could contact an object detected by the various sensors. For example, other machinery, such as a generator, may be currently located near machine 100. Based on a comparison of sensor input indicating the location of the other machinery and the dimensions of safety dome 102, an alert may be provided to an operator of machine warning the operator of the presence of the machinery.

In one embodiment, operation of machine 100 near avoidance areas defined by site information loaded onto site-aware controller 200 can also be used to trigger intrusive warnings. For example, an intrusive alert can be provided to a machine operator when the safety dome surrounding a moving machine begins to encroach on an area that is to be avoided.

In one embodiment, a warning to an operator is an intrusive warning such as a loud sound or a bright light. Devices to produce these intrusive warnings, in one embodiment, are located in a cab of machine 100 nearby an operator or the machine. In one embodiment, the safety dome system provides a signal to a warning system which generates an alert such as a buzzer, a warning display (visual warning), a cockpit alert (e.g., an alert in the cab of a machine), a light, or a notification via a heads-up display.

In one embodiment, site-aware controller 202 inhibits that start of movement of machine 100 and independently moveable implements located on machine 100 toward the object and only allows an operator to initiate movements away from the object.

Figure 10:
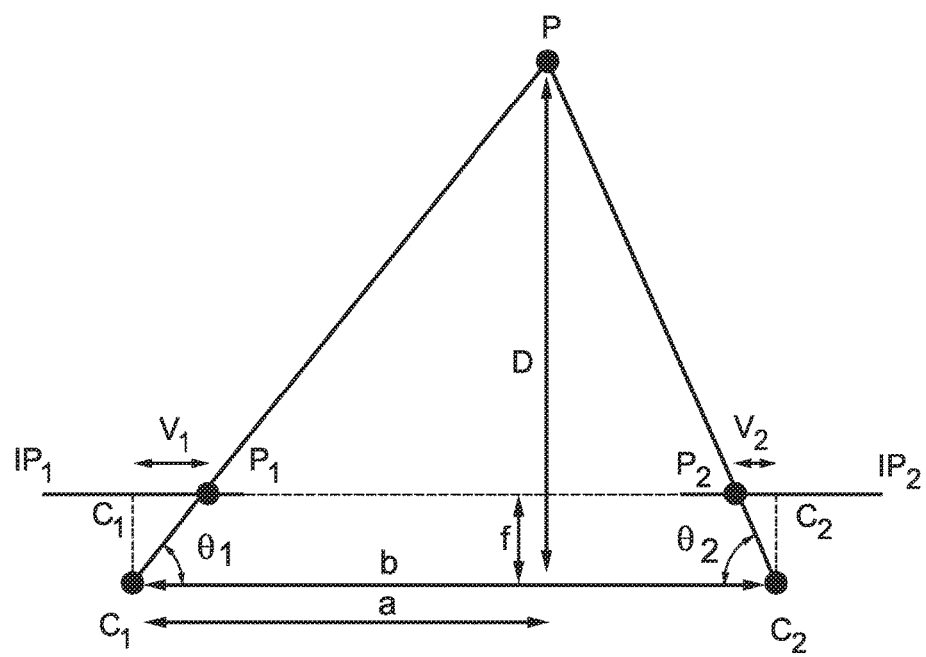
FIG. 10 depicts an example of how stereo vision can be used to determine a distance an object or obstacle is from a pair of cameras.

FIG. 10 depicts an example of how stereo vision can be used to determine a distance an object is from a pair of cameras. Stereo vision is a technique that uses two cameras to measure distances from the cameras, similar to human depth perception with human eyes. The processor uses two parallel cameras aligned at a know distance of separation. Each camera captures an image and these images are analyzed for common features. Triangulation is used with the relative position of these matched pixels in the images as seen in FIG. 10. Triangulation requires knowing the focal length of the camera (f), the distance between the camera bases (b), and the center of the images on the image plane ($c_1$ and $c_2$). Disparity (d) is the difference between the lateral distances to the feature pixel ($v_1$ and $v_2$) on the image plane from their respective centers. Using the concept of similar triangles, the distance from the cameras (D) is calculated as $D = b*f/d$.

Figure 11:
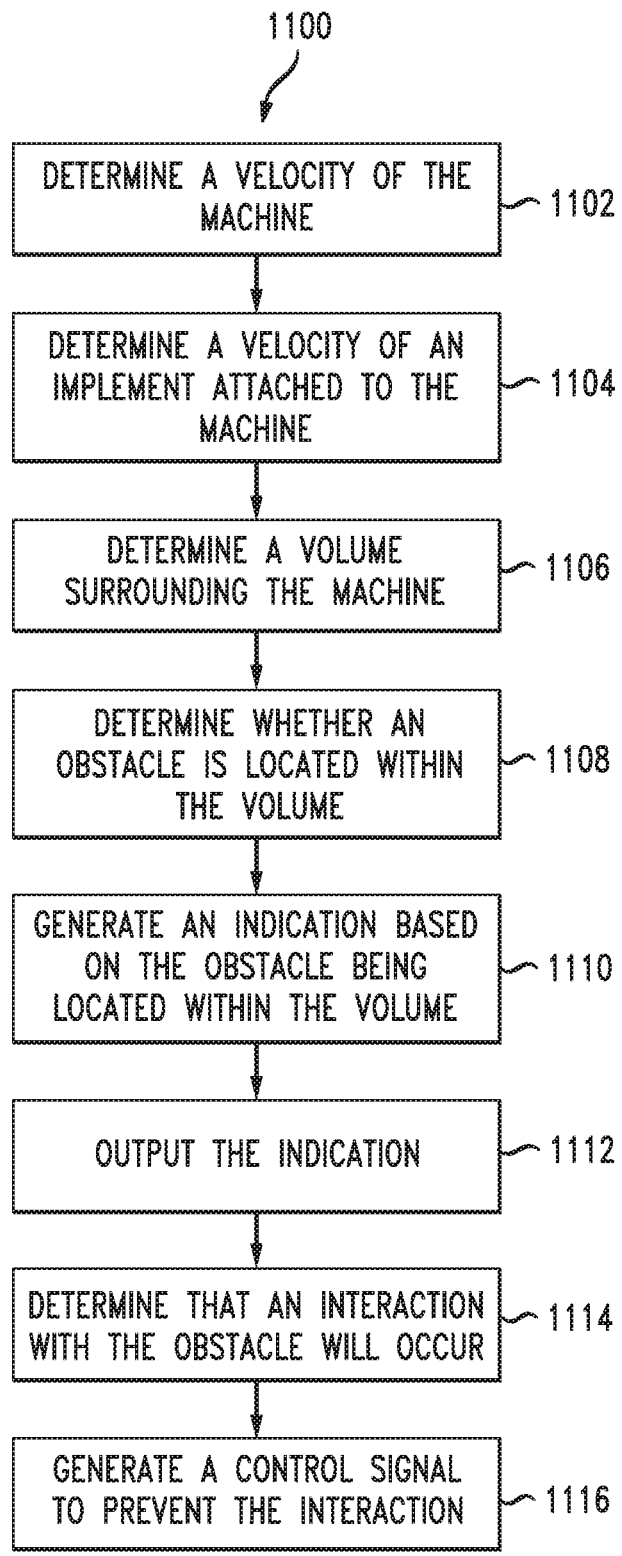
FIG. 11 depicts a flow chart of a method according to an embodiment.

FIG. 11 depicts a flow chart of method 1100 for alerting an operator of obstacles (such as object 110 shown in FIG. 1) within a volume surrounding a machine according to one embodiment. At step 1102, a velocity of a machine is determined. The velocity of the machine, in one embodiment is determined using a GPS receiver but can be determined via other methods such as using sensors associated with the drive wheels or tracks of the vehicle. Machine velocity may also be determined using one or more of the sensors described above. At step 1104, a velocity of an independently moveable implement attached to the machine is determined. In one embodiment, the velocity of the independently moveable implement is determined using camera 206 (shown in FIG. 2) but can be determined using other methods using other sensors described above. For example, hydraulic actuation (or other types of actuation) of the independently moveable implement can be used to determine movement (and/or velocity) of the independently moveable implement. Sensors located on the independently moveable implement may also be used to determine the velocity of the independently moveable implement (e.g., with respect to the machine). At step 1106, a volume surrounding the machine is determined. As described above, the volume is based on the machine and an independently moveable implement attached to the machine. The volume surrounding the machine can vary based on the velocity of the machine and the velocity of independently moveable implements attached to the machine. As such, the volume surrounding the machine can vary as the machine is operated and steps 1102, 1104, and 1106 may be repeated periodically while the machine is in operation.

At step 1108, it is determined whether an obstacle is located within the volume. An obstacle, such as a fixed obstruction or moving obstruction, is detected in one embodiment using one or more of camera 206, laser 208, and/or radar 210 (shown in FIG. 2). It should be noted that an area of a site to be avoided can also be classified as an obstacle. For example, an area of a site that should not be driven over by the machine can be considered an obstacle. The area to be avoided is identified, in one embodiment, using data that is loaded onto site aware controller 202.

At step 1110, an indication based on the obstacle being located within the volume is generated. In one embodiment, the indication is a visual warning but can be an audible warning in lieu of, or in addition to, the visual warning. In one embodiment, the visual and/or audible warning can change with a change in the proximity of the machine or the independently moveable implement to the obstacle. For example, the frequency of an audible warning can increase as the machine and/or independently moveable implement is moved closer to the obstacle. At step 1112, the indication is output. For example, site-aware controller 202 can output a signal to a buzzer, or other audible alarm. Site-aware controller 202 can also output a signal to a device for visually displaying the indication to the user. For example, site-aware controller 202 can send a signal to a light or an image display that can be used to display an indication to a user. Indications can be audible, visual, or both.

At step 1114, it is determined that an interaction with the obstacle will occur based on one of the velocity of the machine and/or the velocity of the independently moveable implement attached to the machine. An interaction with an obstacle can be a collision with a moveable or fixed object. An interaction can also be the machine or independently moveable implement moving into an area designated to be avoided. An interaction can also be an independently moveable implement contacting an area to be avoided (e.g., an independently moveable implement moving material located in an area to be avoided).

At step 1116, a control signal is generated to prevent the interaction with the obstacle. In one embodiment, site-aware controller 202 generates a signal that is transmitted to a machine control to prevent the machine from interacting with the obstacle. In one embodiment, the control signal causes the machine control to prevent any further movement of the machine and/or the independently moveable implement toward the obstacle. In one embodiment, the control signal causes the machine control to prevent further operation of the machine (e.g., the machine is shut down).

Figure 12:
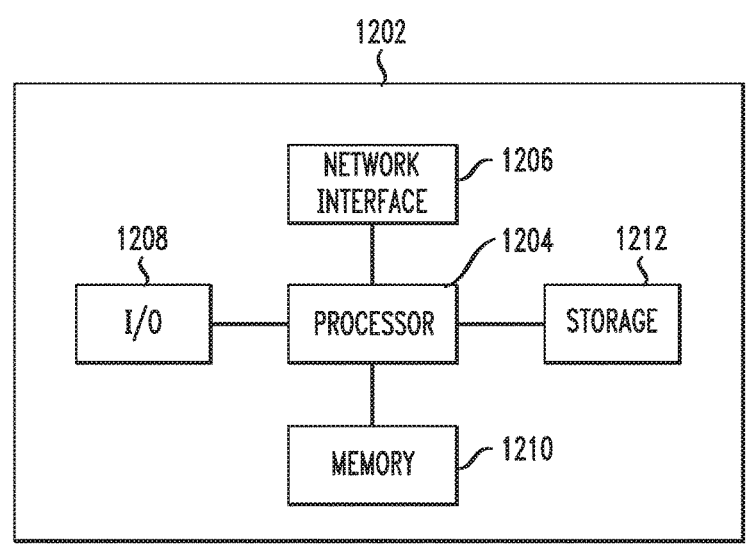
FIG. 12 depicts a high-level block diagram of a computer for implementing a safety dome system according to one embodiment.

In one embodiment, site-aware controller 202, GNSS 204, UWB 212, and other various components and hardware supporting various functions (e.g., radar unit 210, laser 208, and camera 206) can each be implemented using a computer. A high-level block diagram of such a computer is illustrated in FIG. 12. Computer 1202 contains a processor 1204 which controls the overall operation of the computer 1202 by executing computer program instructions which define such operation. The computer program instructions may be stored in a storage device 1212, or other computer readable medium (e.g., magnetic disk, CD ROM, etc.), and loaded into memory 1210 when execution of the computer program instructions is desired. Thus, the operation of site-aware controller 202 can be defined by the computer program instructions stored in the memory 1210 and/or storage 1212 and controlled by the processor 1204 executing the computer program instructions. For example, the computer program instructions can be implemented as computer executable code programmed by one skilled in the art to perform an algorithm defined by the operation of site-aware controller 202. Accordingly, by executing the computer program instructions, the processor 1204 executes an algorithm defined by the operation of site-aware controller 202. The computer 1202 also includes one or more network interfaces 1206 for communicating with other devices via a network. The computer 1202 also includes input/output devices 1208 that enable user interaction with the computer 1202 (e.g., display, keyboard, mouse, speakers, buttons, etc.) One skilled in the art will recognize that an implementation of an actual computer could contain other components as well, and that FIG. 12 is a high level representation of some of the components of such a computer for illustrative purposes. In one embodiment, GNSS 204, UWB 212, and other various components and hardware supporting various functions (e.g., radar unit 210, laser 208, and camera 206) are used as peripherals of an on-board computer, embedded computer/controller or mobile device. In such embodiments, only part of the computational power is hosted by specific sensors and a separate on-board computer, embedded computer/controller or mobile device provides the remaining computational power required.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method comprising:
   determining a current velocity of an independently movable implement attached to a machine;
   determining a volume of a virtual dome surrounding the machine based on the machine, the independently movable implement attached to the machine, and the current velocity of the independently moveable implement attached to the machine;
   determining whether an obstacle is located within the volume;
   generating an indication based on the obstacle being located within the volume;
   outputting the indication to a user;
   determining that an interaction with the obstacle will occur based on a current velocity of the machine and the current velocity of the independently movable implement attached to the machine;
   generating a control signal to prevent the interaction with the obstacle in response to the determining that the interaction with the obstacle will occur; and
   preventing any further movement of the machine or the independently moveable implement toward the obstacle in response to the control signal.

2. The method of claim 1, wherein the determining the volume of the virtual dome surrounding a machine further comprises:
   determining the current velocity of the machine,
   wherein the volume of the virtual dome surrounding the machine is further based on the velocity of the machine.

3. The method of claim 1, wherein the obstacle is one of a fixed obstruction, a moveable obstruction, a person, or an area to be avoided.

4. The method of claim 1, wherein the determining whether an obstacle is located within the volume is based on data pertaining to a site in which the machine is located.

5. The method of claim 4, wherein the data pertaining to the site in which the machine is located identifies areas of a site to be avoided.

6. An apparatus comprising:
   a processor; and
   a memory to store computer program instructions, the computer program instructions when executed on the processor cause the processor to perform operations comprising:
   determining a current velocity of an independently movable implement attached to a machine;
   determining a volume of a virtual dome surrounding the machine based on the machine, the independently movable implement attached to the machine, and the current velocity of the independently moveable implement attached to the machine;
   determining whether an obstacle is located within the volume;
   generating an indication based on the obstacle being located within the volume;
   outputting the indication to a user;
   determining that an interaction with the obstacle will occur based on a current velocity of the machine and the current velocity of the independently movable implement attached to the machine;
   generating a control signal to prevent the interaction with the obstacle in response to the determining that the interaction with the obstacle will occur; and
   preventing any further movement of the machine or the independently moveable implement toward the obstacle in response to the control signal.

7. The apparatus of claim 6, wherein the determining the volume of the virtual dome surrounding a machine further comprises:
   determining the current velocity of the machine,
   wherein the volume of the virtual dome surrounding the machine is further based on the velocity of the machine.

8. The apparatus of claim 6, wherein the obstacle is one of a fixed obstruction, a moveable obstruction, a person, or an area to be avoided.

9. The apparatus of claim 6, wherein the determining whether an obstacle is located within the volume is based on data pertaining to a site in which the machine is located.

10. The apparatus of claim 9, wherein the data pertaining to the site in which the machine is located identifies areas of a site to be avoided.

11. A non-transitory computer readable medium storing computer program instructions, which, when executed on a processor, cause the processor to perform operations comprising:
  determining a current velocity of an independently movable implement attached to a machine;
  determining a volume of a virtual dome surrounding the machine based on the machine, the independently movable implement attached to the machine, and the current velocity of the independently moveable implement attached to the machine;
  determining whether an obstacle is located within the volume;
  generating an indication based on the obstacle being located within the volume;
  outputting the indication to a user;
  determining that an interaction with the obstacle will occur based on a velocity of the machine and the current velocity of the independently movable implement attached to the machine;
  generating a control signal to prevent the interaction with the obstacle in response to the determining that the interaction with the obstacle will occur; and
  preventing any further movement of the machine or the independently moveable implement toward the obstacle in response to the control signal.

12. The non-transitory computer readable medium of claim 11, wherein the determining the volume the virtual dome surrounding a machine further comprises:
  determining a current velocity of the machine,
  wherein the volume of the virtual dome surrounding the machine is further based on the current velocity of the machine.

13. The non-transitory computer readable medium of claim 11, wherein the obstacle is one of a fixed obstruction, a moveable obstruction, a person, or an area to be avoided.

14. The non-transitory computer readable medium of claim 11, wherein the determining whether the obstacle is located within the volume is based on data pertaining to a site in which the machine is located.

* * * * *